June 12, 1923.

J. PUECH 1,458,437

TREAD GRIP FOR THE WHEELS OF MOTOR OR TRACTOR VEHICLES

Filed Dec. 15, 1919

Inventor-
Jules Puech,
By B. Singer, Atty.

Patented June 12, 1923.

1,458,437

UNITED STATES PATENT OFFICE.

JULES PUECH, OF PARIS, FRANCE.

TREAD GRIP FOR THE WHEELS OF MOTOR OR TRACTOR VEHICLES.

Application filed December 15, 1919. Serial No. 345,036.

*To all whom it may concern:*

Be it known that I, JULES PUECH, residing in Paris, France, have invented new and useful Improvements in Tread Grips for the Wheels of Motor or Tractor Vehicles, of which the following is a specification.

This invention relates to tread grips which are fixed by rivets to the rims of the felloes of wheels of vehicles adapted to move over different types of ground, such as the wheels of agricultural tractors.

The accompanying drawings show by way of example the structure of such a ribbed tread grip.

Figure 1:
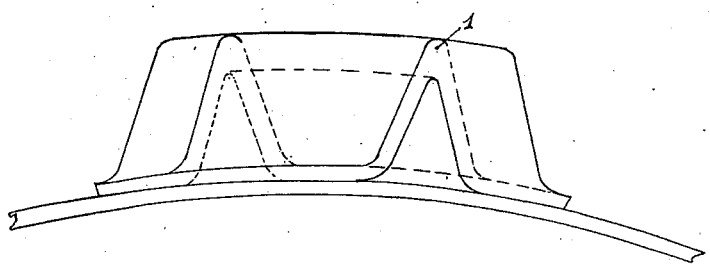

Fig. 1. Elevation of the tread grip in position on the half rim of the wheel.

Figure 2:
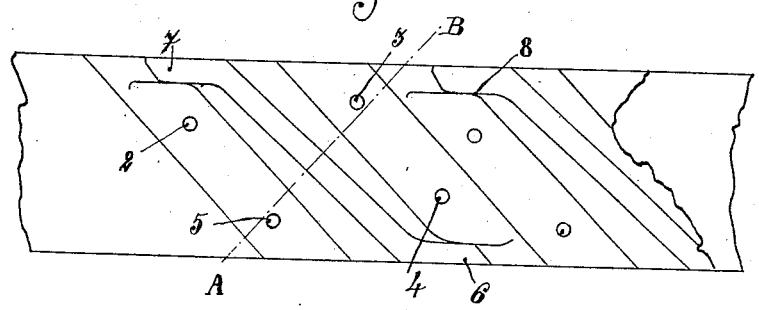

Fig. 2. Plan of same and of the adjacent tread grip in position on the half rim.

Figure 3:
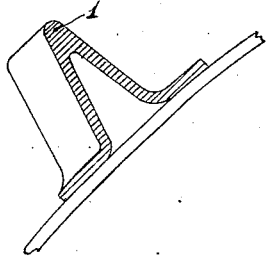

Fig. 3. Transverse section on line A—B showing the shape in cross section of the tread grip.

It will be seen from the accompanying drawings that the tread grip shown in plan in Fig. 2 comprising an intermediate section 10 inclined at an angle of 45 degrees to the side edges of the wheel rim and oppositely extending end sections 6, 7 which are parallel with the side edges of the rim. In cross section the section 10 is V-shaped (Fig. 3) and is characterized by a very acute angle at the point where the two sides of the rib meet, thus producing at the apex 1 a curve of small diameter forming a sharp edge. The extremities 6 and 7 are formed of two full members which extend to the edges of the rim and consequently to both the interior and exterior side edges of the wheel.

The plan view shown in Fig. 2 illustrates the whole of the tread grip the face of which applied on the rim has the same curvature as that of the rim. It is held in position by four rivets 2, 3, 4 and 5.

As will be seen from Fig. 2 the tread grips are juxtaposed, each tread grip on the rim so close the preceding one that the wheel in turning rests at the same time on the member 6 of one tread grip and on the member 8 of the next. Thus all shock during rotation is prevented, as there is no discontinuing of the line of contact with the soil as would be produced for example on hard ground.

Moreover when the wheel of the vehicle rotates on soft ground the tread grips above described fulfil the position of studs. The continuity of contact resulting from the Z shaped form of the tread grips and the proximity of the adjacent tread grips gives to the driving wheels a continuous line of points of contact and prevents jerks which are to be feared in the usual straight bars placed on the felloe parallel to the axle.

The form of the tread prevents the setting up of transverse forces such as would rapidly fatigue the wheels and axles owing to the provision of the end sections 6 and 8 which are parallel with the side edges of the rim.

The ease of adjustment of the rim with the tread grips affixed in position allows of their being removed when the vehicle is being transported from one place to another, the vehicle then running on the felloes alone.

I claim:

A wheel having tread grips on the periphery of its rim, each tread grip comprising an intermediate section which extends across the periphery of the rim and is arranged substantially at an angle of 45 degrees with respect to the side edges of the rim, and oppositely extending end sections which are arranged substantially parallel with the said side edges, the front and rear edges of each section being also substantially at an angle of 45 degrees with respect to the side edges of the rim and said tread grips being juxtaposed.

In testimony whereof I affix my signature.

JULES PUECH.